(12) United States Patent
Poudel Karmatha et al.

(10) Patent No.: US 10,769,744 B2
(45) Date of Patent: Sep. 8, 2020

(54) COMPUTER VISION SYSTEM AND METHOD

(71) Applicant: Kabushiki Kaisha Toshiba, Minato-ku (JP)

(72) Inventors: Rudra Prasad Poudel Karmatha, Cambridge (GB); Ujwal Bonde, Cambridge (GB); Stephan Liwicki, Cambridge (GB); Christopher Zach, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 88 days.

(21) Appl. No.: 16/176,801

(22) Filed: Oct. 31, 2018

(65) Prior Publication Data
US 2020/0134772 A1  Apr. 30, 2020

(51) Int. Cl.
*G06K 9/62* (2006.01)
*G06T 1/00* (2006.01)
(Continued)

(52) U.S. Cl.
CPC ........ *G06T 1/0014* (2013.01); *G06K 9/00201* (2013.01); *G06K 9/00805* (2013.01);
(Continued)

(58) Field of Classification Search
CPC ............. G06N 3/126; G06N 20/20; G06T 2207/20084; G06T 7/0002; G06T 7/0014;
(Continued)

(56) References Cited

U.S. PATENT DOCUMENTS

2017/0169313 A1* 6/2017 Choi ................... G06K 9/4628
2018/0161986 A1* 6/2018 Kee ........................... G06T 7/75
(Continued)

OTHER PUBLICATIONS

Abadi, M., et al.,"TensorFlow: Large-scale machine learning on heterogeneous systems", 2015. Retrieved from the internet, URL https://www.tensorflow.org/, pp. 1-19.
(Continued)

*Primary Examiner* — Quan M Hua
(74) *Attorney, Agent, or Firm* — Oblon, McClelland, Maier & Neustadt, L.L.P.

(57) ABSTRACT

An image processing method for segmenting an image, the method comprising:
  receiving first image;
  producing a second image from said first image, wherein said second image is a lower resolution representation of said first image;
  processing said first image with a first processing stage to produce a first feature map;
  processing said second image with a second processing stage to produce a second feature map; and
  combining the first feature map with the second feature map to produce a semantic segmented image;
  wherein the first processing stage comprises a first neural network comprising at least one separable convolution module configured to perform separable convolution and said second processing stage comprises a second neural network comprising at least one separable convolution module configured to perform separable convolution; the number of layers in the first neural network being smaller than the number of layers in the second neural network.

20 Claims, 9 Drawing Sheets
(2 of 9 Drawing Sheet(s) Filed in Color)

(51) Int. Cl.
  *G06T 7/11* (2017.01)
  *G06K 9/00* (2006.01)
  *G06N 3/04* (2006.01)
  *G06N 20/00* (2019.01)
(52) U.S. Cl.
  CPC .......... *G06N 3/0454* (2013.01); *G06N 20/00* (2019.01); *G06T 7/11* (2017.01)
(58) Field of Classification Search
  CPC ............. G06T 7/20; G06T 2207/30168; G06T 2207/20076; G06T 15/205; G06T 2207/10012; G06K 9/4628; G06K 2209/05; G06K 9/00369; G06K 9/46; G06K 9/6262; G06K 9/00147; G06K 9/00302; G06K 9/0063; G06K 9/325; G16H 30/40; G06F 16/55
  See application file for complete search history.

(56) References Cited

U.S. PATENT DOCUMENTS

| | | | |
|---|---|---|---|
| 2018/0165548 A1* | 6/2018 | Wang | G06N 3/0454 |
| 2018/0189578 A1* | 7/2018 | Yang | G01C 21/3638 |

OTHER PUBLICATIONS

Badrinarayanan, V., et al., "SegNet: A Deep Convolutional Encoder-Decoder Architecture for Image Segmentation", TPAMI, IEEE, 2017, pp. 1-14.
Brostow, G. J., et al., "Semantic object classes in video: A high-definition ground truth database", Pattern Recognition Letters, vol. 30 No. 2, 2009, pp. 1-10.
Burt, P.J., et al., "The Laplacian Pyramid as a Compact Image Code", IEEE Transactions on Communications, vol. COM-31 No. 4, Apr. 1983, pp. 532-540.
Chen, L.-C., et al., "DeepLab: Semantic Image Segmentation with Deep Convolutional Nets, Atrous Convolution, and Fully Connected CRFs", IEEE, arXiv:1606.00915 [cs], 2016, pp. 1-14.
Chollet, F.,"Xception: Deep Learning with Depthwise Separable Convolutions", arXiv:1610.02357 [cs], Computer Vision Foundation, Google Inc., 2016, pp. 1251-1258.
Cordts, M., et al., "The Cityscapes Dataset for Semantic Urban Scene Understanding", in CVPR, 2016, 1-11 with cover pages.
Frankle, J., et al., "The lottery ticket hypothesis: Training pruned neural networks", arXiv preprint arXiv:1803.03635, ICLR, 2018, pp. 1-39.
Ghiasi, G., et al., "Laplacian Pyramid Reconstruction and Refinement for Semantic Segmentation", arXiv:1605.02264 [cs], Computer Vision and Pattern Recognition, May 2016, pp. 1-16.
Han, S., et al., "Deep Compression: Compressing Deep Neural Networks with Pruning, Trained Quantization and Huffman Coding", in ICLR, 2016, pp. 1-14.
He, K., et al., "Deep Residual Learning for Image Recognition", Microsoft Research Asia, arXiv:1512.03385 [cs], 2015, 27 pages.
Howard, A., et al., "MobileNets: Efficient Convolutional Neural Networks for Mobile Vision Applications", Google, Inc., arXiv:1704.04861 [cs], Apr. 17, 2017, pp. 1-9.
Courbariaux, M., et al., "Binarized Neural Networks: Training Neural Networks with Weights and Activations Constrained to +1 or −1", in NIPS, Mar. 17, 2016, 11 pages.
Li, H., et al., "Pruning Filters for Efficient ConvNets", in Proceedings of NIPS Workshop on Efficient Methods for Deep Neural Networks, in ICLR, Dec. 2016, pp. 1-5.
Lin, G., et al., "RefineNet: Multi-Path Refinement Networks for High-Resolution Semantic Segmentation", in CVPR, Computer Vision Foundation, 2017, pp. 1925-1934.
Menze, M., et al., "Object Scene Flow for Autonomous Vehicles", in Conference on Computer Vision and Pattern Recognition (CVPR), 2015, 10 pages.
Paszke, A., et al., "ENet: A Deep Neural Network Architecture for Real-Time Semantic Segmentation", Under review as a conference paper at ICLR 2017, arXiv:1606.02147 [cs], pp. 1-10.
Rastegari, M., et al., "XNOR-Net: ImageNet Classification Using Binary Convolutional Neural Networks", in ECCV, 2016, 105 pages.
Romera, E., et al., "ERFNet: Efficient Residual Factorized ConvNet for Real-Time Semantic Segmentation", IEEE Transactions on Intelligent Transportation Systems, 2018, pp. 1-10.
Ronneberger, O., et al., "U-Net Convolutional Networks for Biomedical Image Segmentation", in MICCAI, May 18, 2015, pp. 1-8.
Russakovsky, O., et al., "ImageNet Large Scale Visual Recognition Challenge", International Journal of Computer Vision (IJCV), 2015, pp. 1-38 with cover page.
Sandler, M., "MobileNetV2: Inverted Residuals and Linear Bottlenecks", Mobile Networks for Classification, Detection and Segmentation, arXiv:1801.04381 [cs], Apr. 2018, 14 pages.
Long, J., et al., "Fully Convolutional Networks for Semantic Segmentation", PAMI, 2016, 10 pages.
Szegedy, C., et al., "Rethinking the Inception Architecture for Computer Vision", in CVPR, Computer Vision Foundation, 2016, pp. 2818-2826.
Hinton, G., et al., "Lecture 6.5-RMSProp, Coursera: neural networks for machine learning", University of Toronto, Technical Report, 2012, 31 pages.
Wu, S., et al., "Training and Inference with Integers in Deep Neural Networks", in ICLR, 2018, pp. 1-14.
Zhao, H., et al., "ICNet for Real-Time Semantic Segmentation on High-Resolution Images", Retrieved from the internet: https://hszhao.github.io/papers/eccv18_icnet_supp.pdf , arXiv:1704.08545 [cs], Apr. 27, 2017, 9 pages.
Zhao, H., et al., "Pyramid Scene Parsing Network", in CVPR, Computer Vision Foundation, 2017, pp. 2881-2890.
Mazzini, D., "Guided Upsampling Network for Real-Time Semantic Segmentation", Retrieved from the internet: bmvc2018.org/contents/papers/0423.pdf , 2018, pp. 1-12.
Yu, C., et al., "BiSeNet: Bilateral Segmentation Network for Real-time Semantic Segmentation", arXiv:1808.00897v1 [cs.CV], ECCV 2018: Computer Vision, Aug. 2, 2018, pp. 1-17.

* cited by examiner

COMPUTER VISION SYSTEM AND METHOD

FIELD

Embodiments are concerned with a computer vision system and method.

BACKGROUND

Many computer vision tasks, for example object recognition and registration require the segmentation of an image where regions of the image are provided with a label. Semantic Segmentation provides detailed pixel-level specification, which is particularly suited for applications which often require obstacle detection and accurate boundary detection. Such applications include but are not limited to autonomous vehicles and driver assistants, embedded and wearable devices.

Modern semantic segmentation methods achieve highly accurate results, but often at the cost of reduced efficiency. Recent development of convolutional neural networks (CNNs) marks significant improvement in the results achieved by these networks. Their effectiveness, however, is largely dependent on the number of operations and parameters involved in the model. Modern semantic segmentation methods require more than a second to perform object classification of a single image, even if the processing is performed on a high-end Graphic Processing Unit (GPU). The complexity of these methods hinders their deployment in real-time applications.

Autonomous driving is a complex task which not only requires object detection and recognition with high precision but also a real-time operation of the object classification neural network. Therefore, a new approach for semantic segmentation is required where the semantic segmentation is performed in real-time without compromising the precision of the object classification.

BRIEF DESCRIPTION OF FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
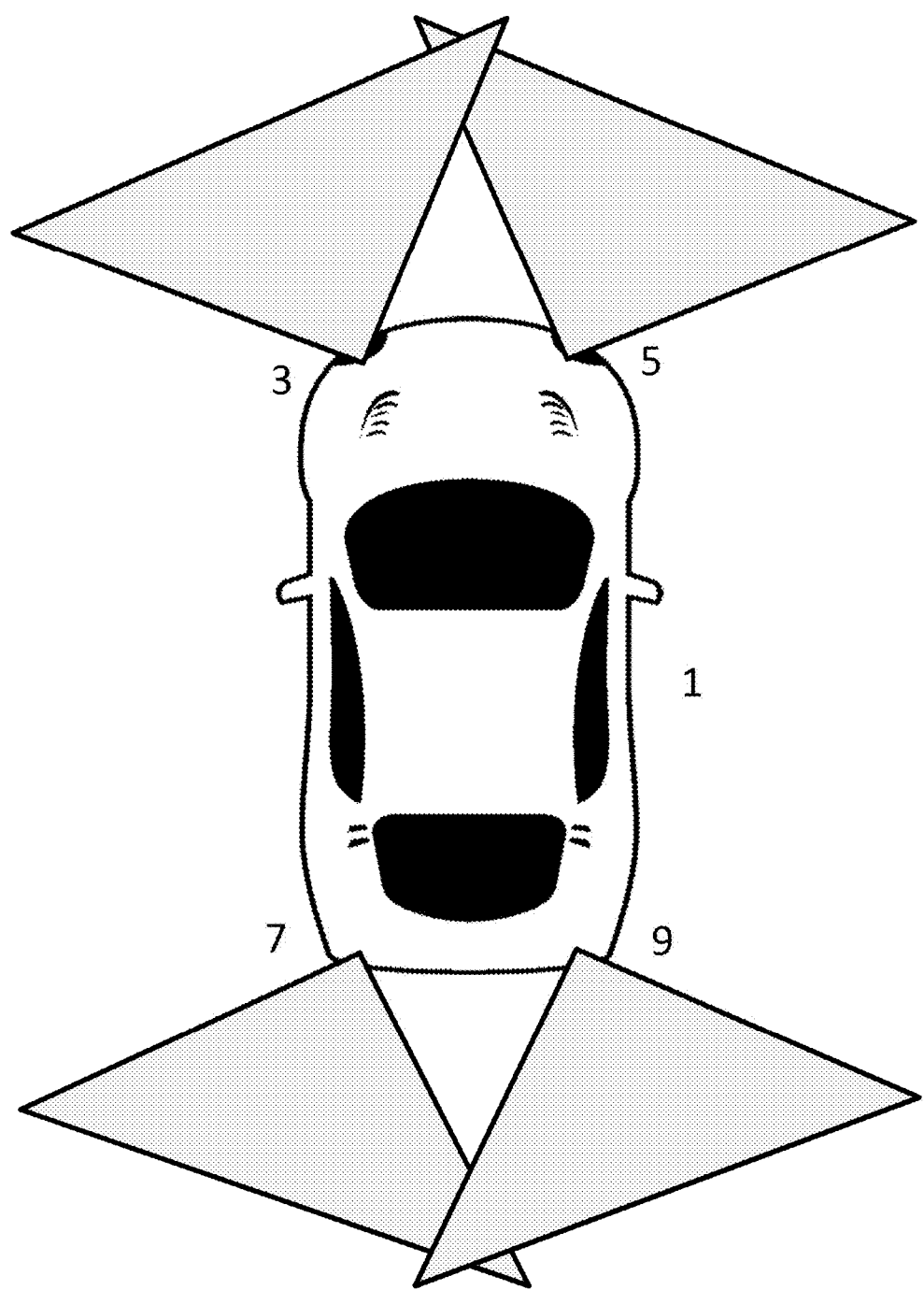
FIG. 1 is a system in accordance with an embodiment implemented on a vehicle.
Figure 1:
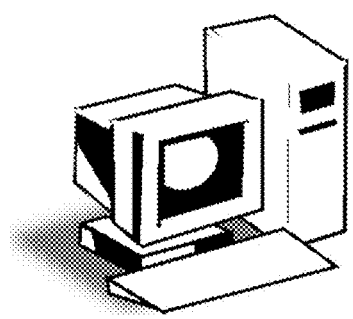

In an embodiment, an image processing method for segmenting an image is provided, the method comprising:
receiving first image;
producing a second image from said first image, wherein said second image is a lower resolution representation of said first image;
processing said first image with a first processing stage to produce a first feature map;
processing said second image with a second processing stage to produce a second feature map; and
combining the first feature map with the second feature map to produce a semantic segmented image;
wherein the first processing stage comprises a first neural network comprising at least one separable convolution module configured to perform separable convolution and said second processing stage comprises a second neural network comprising at least one separable convolution module configured to perform separable convolution; the number of layers in the first neural network being smaller than the number of layers in the second neural network.

The disclosed system addresses a technical problem tied to computer technology and arising in the realm of computing, namely the technical problem of providing real time semantic segmentation The disclosed system solves this technical problem by a two branch neural network architecture where a low resolution branch is processed for context and a high resolution branch for spatial accuracy. The improvement is provided by the specific configuration of convolutional network blocks on each branch.

The illustrated embodiment of the system comprises a network architecture, which combines a sub-network branch at full resolution and a sub-network branch at a reduced resolution. The second sub-network branch, which is related to a lower-resolution image, aims at classifying or otherwise identifying the objects that make up the image or the scene. Furthermore, the lower-resolution branch is described for assigning labels to the object present in the scene. Whereas the full-resolution sub-network branch is primarily responsible for refining the object boundaries for high resolution segmentation results.

In the above embodiment, real-time performance is obtained by using a context branch network at low resolution that is deep, with a detail branch network at high resolution that is rather shallow. As such, the network perceives context at low resolution and refines it with high resolution results.

The architecture of the above embodiment is designed to ensure that the low resolution context branch is mainly responsible for providing the correct objects label, whereas the high-resolution detail branch refines the segmentation boundaries.

The model of the above embodiment reduces computational cost since:
i) In context processing there is a need to learn more complex and abstract features thus a deeper network is needed. However, a higher resolution input is not required, hence model cost is reduced by using lower resolution input on context branch.
ii) In boundary processing there is a need for a high resolution input. However, there is not a need to see large field of view, hence model cost is reduce by using few layers in the detail branch.

iii) Hence, operating the two branches for two different purposes as mentioned above reduces the overall model cost.

The above embodiments provide:

A method for efficient real-time semantic image segmentation of 2 megapixels (2048×1024 pixels) images, suited, but not limited, to low resource (embedded) devices A method for semantic image segmentation using two branch deep neural networks to reduce the computational cost (number of floating point operations, memory and power)

A method where the gist of scene (e.g. related to general objects), and details (related to boundaries) are learned separately In an embodiment of the object identification and classification system is realised as a machine learning module using neural networks. In an embodiment of the system feed-forward neural networks are used. The system accepts an input in the form of a high-resolution image and generates an output in accordance with the values of the internal weight parameters of the model. The weights of the neural network are determined during the training procedure, where the system is provided with a variety of sample images and the weights are adjusted in accordance with the error in the generated output with respect to the target output. Weights are adjusted so that the error between the generated output and the target output is reduced to minimum.

In an embodiment, both the low resolution branch and the full resolution branch are realised using neural networks. The number of layers in the low resolution branch is higher than the number of layers in the high resolution branch.

In an embodiment, the above system uses depth-wise separable convolutions to factorize standard convolution (Conv2d) into a depth-wise convolution (DWConv), also known as spatial or channel-wise convolution, followed by a 1×1 point-wise convolution layer. Cross-channel and spatial correlation is therefore computed independently, which drastically reduces the number of parameters, resulting in fewer floating point operations and fast execution time.

In an embodiment, the first feature map and the second feature map are combined at just one stage. The output of a high resolution branch is combined with a low resolution branch only once—I.e. the first feature map and the second feature map is combined in a fusion unit.

In one embodiment, the first feature map and the second feature map are combined at a fusion stage, wherein said fusion stage comprises upsampling the second feature map and adding the first feature map to the second feature map wherein adding comprises adding corresponding values of the upsampled second feature map and the first feature map.

In a further embodiment, the first feature map and the second feature map are combined by adding. In an embodiment the second feature map of size a*b*c (from low resolution after upsampling) is combined with the second feature map of size a*b*c to create combined feature map C of size a*b*c by adding both numbers. No concatenation is needed and this allows the memory footprint to be kept small.

The upsampled second feature map may be subjected to depthwise convolution prior to adding to the first feature map, wherein the depthwise convolution is performed with a dilation factor that is greater than 1.

In a further embodiment, the upsampled second feature map that has been subjected to depthwise convolution with a dilation factor that is greater than 1 and the first feature map are subjected to two dimensional convolution prior to adding.

In one embodiment, the depth-wise convolution modules in the second processing stage are bottleneck architecture modules. Bottleneck architecture modules perform a feature expansion which is followed by a depthwise convolution that is followed by a point convolution. Therefore, these can also be considered to be implementing depthwise separable convolution.

In an embodiment, the depth-wise convolution modules in the second processing stage are bottleneck residual architecture modules. There may be a plurality of residual bottleneck architecture modules. The number of output channels from the residual bottleneck architecture modules may increase in subsequent modules in the plurality of residual bottleneck architecture modules.

The second image may be subjected to standard convolution prior to be processed by said depthwise convolution modules. A final standard convolution module may be provided after the residual bottleneck architecture modules.

In one embodiment, a pyramid pooling module is provided between the final standard convolution module and the residual bottleneck architecture modules.

The first processing stage may comprise a plurality of depthwise separable convolution modules. The first image may be subjected to standard convolution prior to processing by said depthwise separable convolution modules.

In an embodiment, a method of training a model is provided, said model for segmenting an image, the model comprising:
  a first neural network having a plurality of layers comprising at least one separable convolution module configured to perform separable convolutions;
  a second neural network with a plurality of layers, comprising at least one separable convolution module configured to perform separable convolutions; the number of layers in the first neural network being smaller than the number of layers in the second neural network,
  the first neural network being configured to process an image at a first resolution and the second neural network being configured to process the same image at a lower resolution,
  the feature map of the first and second neural networks being combined by addition at a single stage;
  the training method comprising:
  providing training data, the training data comprising images and semantic segmented information concerning said images;
  training said model using said images as the input and the semantic segmented info as the output, wherein the two stages are trained together.

In further embodiment, parameter pruning may be implemented during training.

In a further embodiment, the training method may further comprise adapting the model during training to add a second output on said second processing stage, the method further comprising training using the images as input and determining the loss by comparing with both the semantic segmented information at both the output and at the second output and updating the weights during training by using the determined losses from both outputs.

In an embodiment an image processing system is provided for segmenting an image, the system comprising:
  an interface and a processor,
  said interface having an image input and being adapted to receive a first image, said processor being adapted to;
produce a second image from said first image, wherein said second image is a lower resolution representation of said first image;
process said first image with a first processing stage to produce a first feature map;
process said second image with a second processing stage to produce a second feature map; and
combine the first feature map with the second feature map to produce a semantic segmented image;
wherein the first processing stage comprises a first neural network comprising at least one module configured to perform depthwise separable convolution and said second processing stage comprises a second neural network comprising at least one module configured to perform depthwise convolution; the number of layers in the first neural network being smaller than the number of layers in the second neural network.

In an embodiment, the system is implemented on a vehicle, vehicles on which the system can be implemented include but are not limited to autonomous and semi-autonomous vehicles, equipped with one or a plurality of still digital cameras and or video digital cameras, which provide the input high-resolution images to the system. In an embodiment, the system is realised on a graphics processing unit or central processing unit located in the vehicle. The objective of the system is to classify the object surrounding the vehicle and facilitate the safe navigation of the vehicle towards its final destination.

Thus, in a further embodiment, a detection system for a vehicle is provided, said detection system, the detection system comprising the image processing system as described above, being adapted to receive an image and determine objects from said image by segmenting said image.

Thus, the above embodiment can provide:

Efficient real-time semantic image segmentation for autonomous systems

Autonomous driving+driver assistance systems: fast semantic image segmentation on low resource devices Real-time semantic image segmentation in low powered devices, for an example Nvidia Jetson TX2

In further embodiment, the system can be implemented as a computer program on a computer, where the input images are obtained from a solid state storage unit or are transmitted to the computer by means of a communication protocol.

FIG. 1 is used to illustrate an embodiment of the object classification network, which has been provided on board of a vehicle, so that the system travels along with the vehicle. FIG. 1 shows a schematic of a car 1, where the car 1 is equipped with a collision avoidance system. The collision avoidance system comprises four cameras 3, 5, 7, 9 where a camera 3, 5, 7, 9 is provided in each corner of car 1. Each of the cameras has a wide field of view (FOV) which enables the camera to see a higher extent of the observable world. In one embodiment, each camera 3, 5, 7, 9 may be provided with a very wide-angle fisheye lens, which produces a wide panoramic image. The image from each camera is produced separately, however, the FOV of front cameras 3 and 5 may overlap, leaving no area in front of car 1 where the view is obstructed. FOV of rear cameras 7 and 9 may also overlap, leaving no area behind car 1 where the view is obstructed.

In one embodiment of the system, the image from each camera 3, 5, 7, 9 is processed separately by a single central processing unit (CPU) or GPU. In a further embodiment of the system, each camera 3, 5, 7,9 is provided with a separate CPU or GPU, which processes the image and forwards the processed image to the central CPU of car 1.

Figure 2:
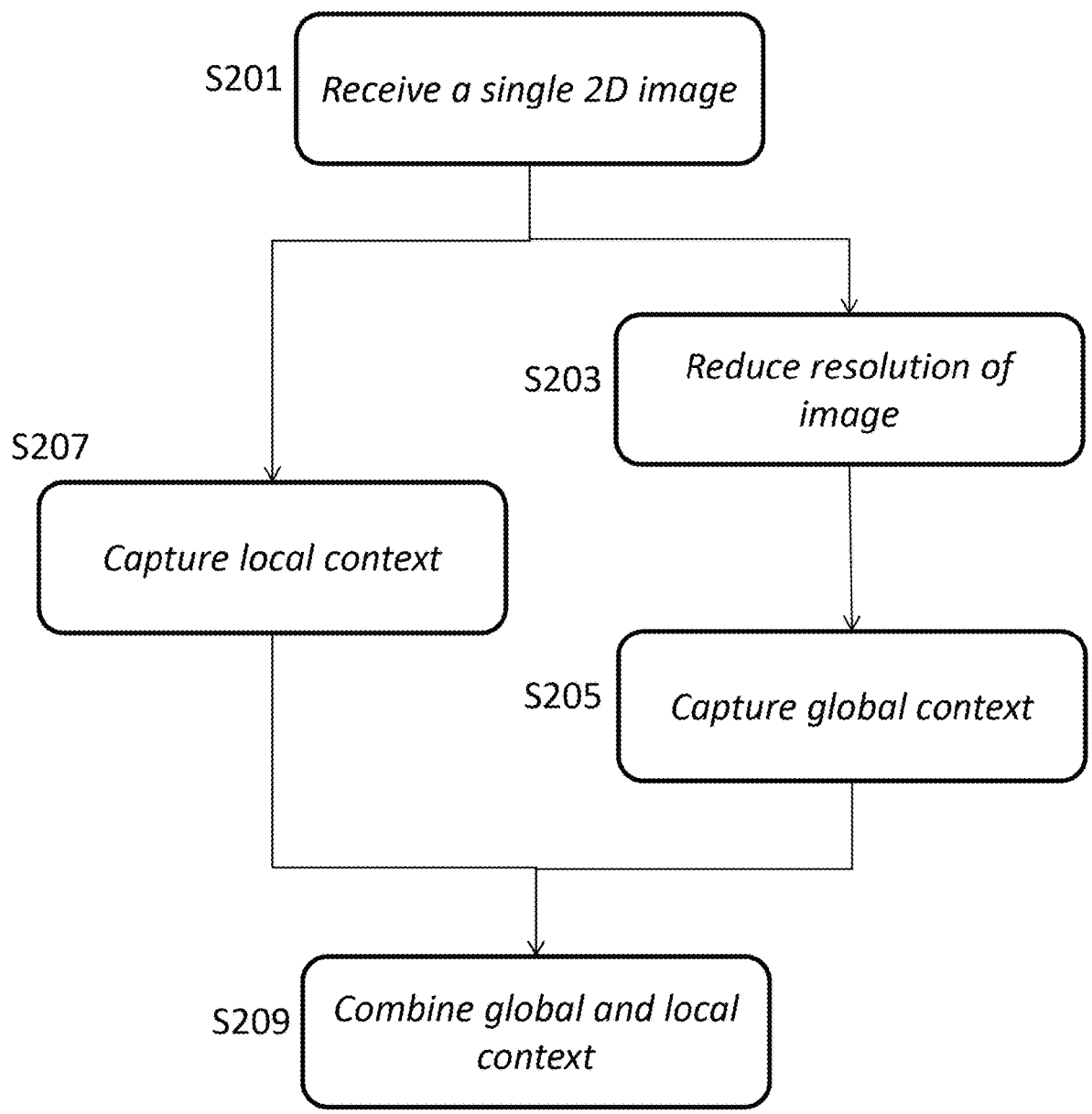
FIG. 2 is a brief flow diagram of a neural network that can be used in the system of FIG. 1, identifying the responsibility of each sub-network branch.

FIG. 2 shows a flow diagram of a system, in accordance with an embodiment, for identification and classification.

In Step S201, camera 3,5,7,9 captures an image of scene, the scene may comprise one or more objects. In an embodiment, the scene is a city street scene. The image is input to an object classification system, where the objects will be consequently identified and provided with a label by a neural network.

After Step 201, in an embodiment, the path of the image diverges in two independent sub-network branches. In the first branch, the image is provided in full resolution and in step S207 a neural network extracts the local context of the scene. The second branch, responsible for extracting global context step S205, is provided with a downsampled representation of the image, Step S203.

In FIG. 2, the second sub-network branch was described to label objects in the scene with the appropriate label. How this is achieved, in accordance with an embodiment, will be described with reference to steps S303 to S309 of FIG. 3.

In Step S303, the image dimensions, length h and width w, are reduced by a factor of n. Therefore the image is downsampled by a factor of $n^2$ for the low resolution sub-network branch. The computational time of the system and the achieved accuracy of the object classification are both inversely proportional to the value of factor n.

In one embodiment, the n factor ranges between 2 and 8. A high value of n results in smaller resolution for the low-resolution branch, effectively reducing the number of operations and achieving faster classification. However, fast operation comes at the cost of reduced accuracy. On the contrary, a lower value of n results in bigger resolution for the low-resolution branch, effectively increasing the accuracy of the object classification but at the cost of increased processing time.

The input image can be represented in a three-dimensional matrix format. Each pixel comprises three channels, where each channels holds a numerical value, associated with the intensity of one of the three colours—red, green and blue (RGB). In standard computation, 2D convolutions can be used employing a h*w*c filter, where h is height, w is width and c is channel. Since h*w*3 (convolution on image with RGB) is similar to h*w*1 (DW convolution), standard convolution is fine here. Note, usually the number of feature channels increase rapidly in CNNs, so h*w*32/64/128 is not unusual. In an embodiment, depthwise convolutions are used with the increasing number of channels.

In Step S305, the first layer of the convolutional neural sub-network is a two-dimensional pooling convolution layer. The pooling layer performs further downsampling operation, where the dimensions of the outputted feature maps are reduced by a factor relative to the stride of the layer. The stride of the layer can be considered to be how much the convolutional kernel is moved as it is scanned across the image. For example, a pooling convolutional layer with stride 1 (1 pixel) will not affect the spatial dimensions of the feature maps, whereas a pooling convolutional layer with stride 2 will downsample their dimensions by a factor of 2. A smaller feature map may yield faster inference, however at the cost of sacrificed prediction accuracy.

In this embodiment, the first convolutional layer applies a plurality of filters or kernels to the input volume. Each filter is compared with the scene and a 2-dimensional feature map is generated. Feature maps represent the spatial arrangements of the activations caused as a result of a match between a filter and an object or feature in the scene. All feature maps are stacked along the depth dimension and produce the output volume. For example, a convolutional neural network comprised of 32 output channels applies 32 filters to the input volume, and generates 32 feature maps which are stacked to render an output volume with depth dimension of 32.

In an embodiment, the object classification is performed with neural networks which utilise a number of depth-wise separable convolution layers. In depth-wise convolution, two-dimensional convolution is performed separately on each input channel and a feature map for each input channel is generated. All feature maps are stacked back together at the end of the convolution procedure. For example, camera 3, 5, 7, 9 provides the neural network with a colour digital image, where each pixel comprises a set of three values, one for red, one for green, and one for blue. When the image is processed with a depth-wise separable convolution layer, two-dimensional convolution is performed separately for each colour.

In an embodiment, the depth-wise convolution layers may be used within bottleneck blocks. Bottleneck residual blocks transfer the input from c to c' channels with height h, width w, expansion factor t, convolutional type kernel-size/stride s and non-linear function f following Table 1.

In the bottleneck block, the input volume is expanded and then it is filtered with a depth-wise convolution layer followed by a pointwise convolution.

In general, first a pointwise convolution is applied (row 1). Then depth-wise convolution and pointwise convolution (row 2 and 3 are applied).

In one embodiment, the following process is followed:
Conv2d 1/1
($1 \times 1 \times c \times t^* c$ parameters)
($h \times w \times 1 \times 1 \times c \times t^* c$ operations)
Conv2d 3/s
($3 \times 3 \times t^* c \times c'$ parameters)
($h/s \times w/s \times 3 \times 3 \times t^* c \times c'$ operations)

However, in an alternate, embodiment, the following could be used
Conv2d 1/1
($1 \times 1 \times c \times t^* c$ parameters)
($h \times w \times 1 \times 1 \times c \times t^* c$ operations)
DWConv 3/s
($3 \times 3 \times 1 \times t^* c$ parameters)
($h/s \times w/s \times 3 \times 3 \times 1 \times t^* c$ operations)
Conv2d 1/1
($1 \times 1 \times t^* c \times c'$ parameters)
($h/s \times w/s \times 1 \times 1 \times t^* c \times c'$ operations)

In the alternative embodiment above, less computation is required and the parameters are fewer.

Learning features at a higher resolution and projecting them to a lower resolution benefit the feature learning procedure. Furthermore, utilizing depth-wise convolution in the bottleneck blocks provides computational efficiency and significantly reduces the memory footprint. In a further embodiment, residual connections may be incorporated in the bottleneck blocks forming bottleneck residual blocks. Residual connection may be used within the bottleneck blocks only if the input and the output volumes have the same spatial dimensions and number of feature maps. A residual connection represents a linear layer which is connected from the input of the bottleneck block to its output. The additional connection layer allows for more effective gradient propagation across multiplier layers and improves the training of the neural networks.

In an embodiment, the bottleneck residual blocks used in Step S307 for object classification system have the structure shown in Table 1. The first layer is a standard two-dimensional convolution layer which expands the dimensions of the input volume by increasing the number of the features maps by a factor of t.

TABLE 1

| Input | Operator | Output |
|---|---|---|
| $h \times w \times c$ | Conv2d 1/1, f | $h \times w \times tc$ |
| $h \times w \times tc$ | DWConv 3/s, f | $\frac{h}{s} \times \frac{w}{s} \times tc$ |
| $\frac{h}{s} \times \frac{w}{s} \times tc$ | Conv2d 1/1, — | $\frac{h}{s} \times \frac{w}{s} \times c'$ |

In the second layer of the bottleneck residual blocks, a depth-wise convolution filter is used to extract features from the scene. The depth-wise convolution has stride s, therefore the output dimensions of the feature maps will be spatially reduced by a factor of s. In convolution layers where the stride is 1, the spatial size of the feature maps is unaffected. The reduction of the spatial size effectively reduces the number of computations in the subsequent network layers. Since convolutions are computed at each depth separately, DWconv improves upon standard convolutions significantly. The reduction of the spatial size effectively reduces the number of computations (not parameters) in subsequent network layers.

The depthwise convolution followed by pointwise convolution does not significantly reduce the accuracy of the object detection in comparison to standard convolution layers. The information is first computed on a channel-wise level, followed by a cheaper standard convolution that combines the channel-wise information. Since the convolution only uses a kernel 1×1, it is faster and requires less parameters.

Lastly, in the bottleneck residual blocks, the output volume generated by the depth-wise separable convolution layer may be projected back to its original low-dimensional representation using a second layer of two-dimensional convolution. The expansion factor t used for the first and the second two-dimensional convolution is the same for the two layers. in an embodiment, a pyramid pooling module (not shown in FIG. 4) is implemented before S309 that is a final convolution layer.

The pyramid pooling module (not shown) partitions the image into divisions from finer to coarser levels, and aggregates local features in them. Spatial pyramid pooling makes it possible to generate representations from arbitrarily sized images/windows for testing, and allows feeding images with varying sizes or scales during training.

Figure 5:
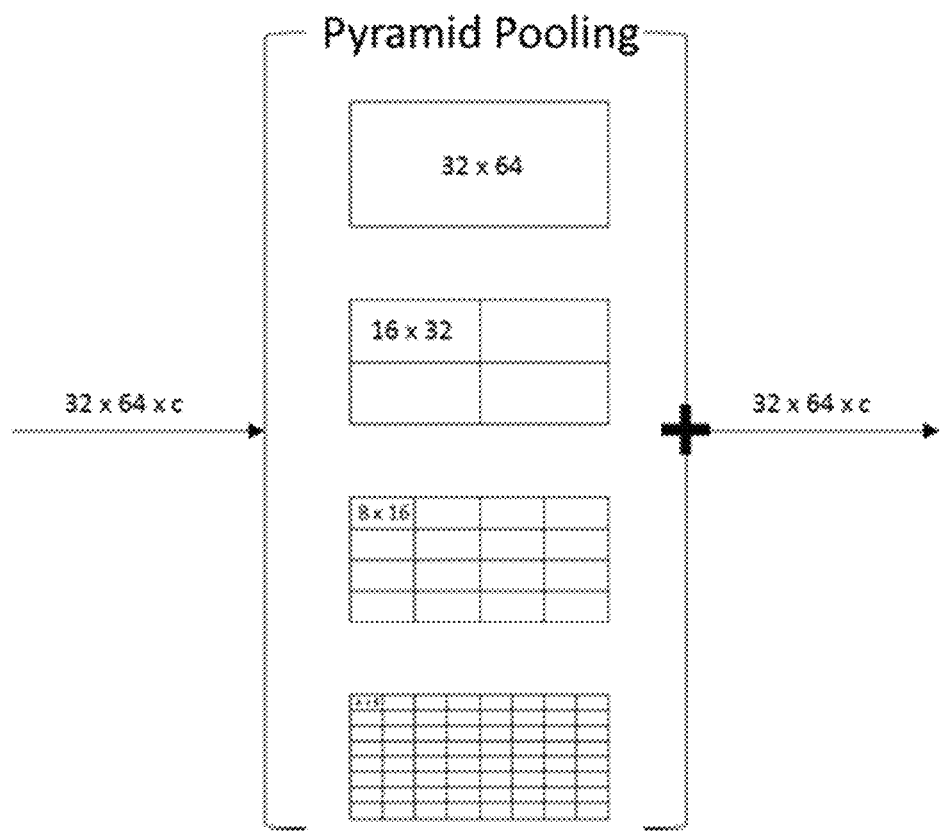
FIG. 5 is a schematic showing the pyramid pooling in more detail.

The pyramid pooling module is shown in more detail in FIG. 5. Here, it is comprised of four kernels, where the resolution of each kernel is 32×64, 16×32, 8×16 and 4×8 respectively. The kernels are equally distributed over the feature map output of Step S307. The resultant four feature maps are bilinearly up-sampled and added together to generate a single feature map output. It is important to note that the feature maps are added. This avoids the need to store all resolutions in the memory.

In an embodiment, the last layer of the lower-resolution sub-network branch is a standard two-dimensional convolution layer, Step S309. At the end of the lower-resolution branch the small spatial dimensions of the feature maps render the use of standard convolution efficient and computationally cheap.

TABLE 2 shows the details of the layers that may be used in accordance with an embodiment.

| Input | Operator | Expansion Factor | Output channels | Repeats | Stride |
|---|---|---|---|---|---|
| 256 × 512 × 3 | Conv2d | — | 32 | 1 | 2 |
| 128 × 256 × 32 | bottleneck | 1 | 32 | 1 | 1 |
| 128 × 256 × 32 | bottleneck | 6 | 32 | 1 | 1 |
| 128 × 256 × 32 | bottleneck | 6 | 48 | 3 | 2 |
| 64 × 128 × 48 | bottleneck | 6 | 64 | 3 | 2 |
| 32 × 64 × 64 | bottleneck | 6 | 96 | 2 | 1 |
| 32 × 64 × 96 | bottleneck | 6 | 128 | 2 | 1 |
| 32 × 64 × 128 | Conv2d | — | 128 | 1 | 1 |

Figure 3:
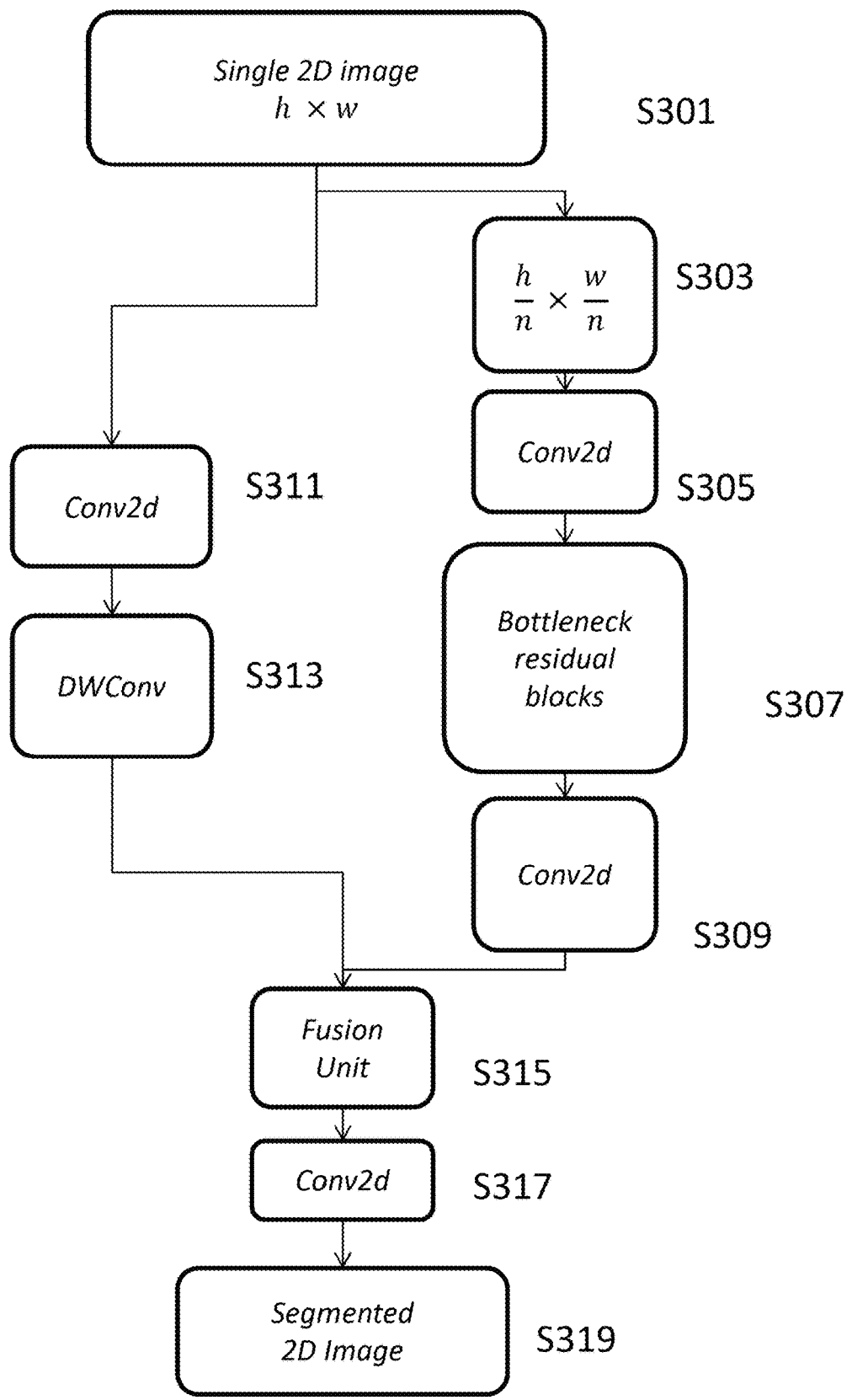
FIG. 3 is a detailed flow diagram of the neural network for object classification.
Figure 4:
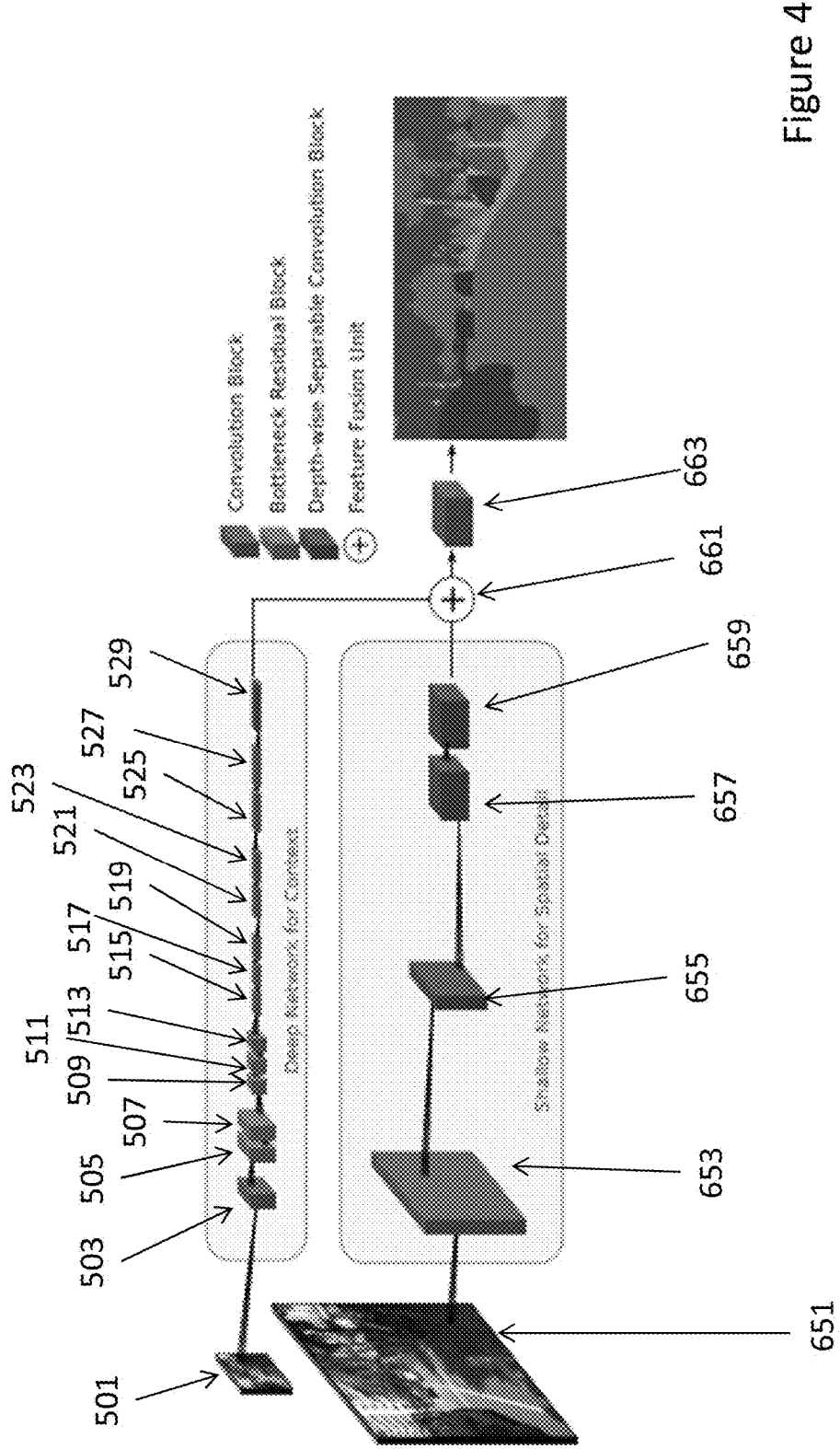
FIG. 4 is a schematic of a network architecture that can be used in accordance with an embodiment.

This is also shown pictorially in FIG. 4. In FIG. 4, the upper branch processes the image 501 with lower resolution. The first layer 503 is a standard two-dimensional convolution layer with stride 2 as described with reference to S305 of FIG. 3.

Next, the output features of the first convolution layer are passed through 12 bottleneck residual layers, 505, 507, 509, 511, 513, 515, 517, 519, 521, 523, 525 and 527.

As will be appreciated by those skilled in the art, the bottleneck residual operator is actually implemented via a plurality of layers as described with reference to table 1. However, as a shorthand in FIG. 4 they are shown as a single layer/operator. The expansion factor used in each bottleneck is shown in table 2.

First bottleneck residual layer 505 has 32 input channels, 32 output channels, stride 1 and an expansion factor (t) of 1.

Second bottleneck residual layer 507 has 32 input channels, 32 output channels, stride 1 and an expansion factor (t) of 6.

Third and fourth bottleneck residual layers 509, 511 have 32 input channels, 32 output channels, stride 1 and an expansion factor (t) of 6.

Fifth bottleneck residual layer 513 has 32 input channels, 48 output channels, stride 2 and an expansion factor (t) of 6.

Sixth and seventh bottleneck residual layers 515, 517 have 64 input channels, 64 output channels, stride 1 and an expansion factor (t) of 6.

Eighth bottleneck residual layer 519 has 48 input channels, 64 output channels, stride 2 and an expansion factor (t) of 6.

Ninth bottleneck residual layer 521 has 64 input channels, 64 output channels, stride 1 and an expansion factor (t) of 6.

Tenth bottleneck residual layer 523 has 64 input channels, 96 output channels, stride 1 and an expansion factor (t) of 6.

Eleventh bottleneck residual layers 525 has 96 input channels, 96 output channels, stride 1 and an expansion factor (t) of 6.

Twelfth bottleneck residual layer 527 has 96 input channels, 128 output channels, stride 1 and an expansion factor (t) of 6.

The last layer of the lower-resolution branch is a standard two-dimensional convolution 529, which can be described with reference to S309 of FIG. 3, has 128 input channels, 128 output channels and stride1.

Thus, as there are three layers used for each bottleneck, there are only 38 layers used to describe the global context.

In the example described herein the structure of 12× bottleneck modules and 2× convolution modules combines efficiency and expressivity (accuracy).

In FIG. 2, the first sub-network branch is primarily used to identify spatial detail. How this is achieved will now be described with reference to steps S311 and S313, illustrated in FIGS. 3 and 4.

In an embodiment, the first sub-network branch of the object classification network receives a full resolution digital input image. In Step S311, a standard two-dimensional convolution layer is used again at the start of the branch in order to achieve more efficient object classification as already described above. This layer of the network is a pooling convolutional layer which down-samples the input volume and generates output maps with reduced spatial dimensions in accordance with the stride. The parameters of the convolution layers in the full-resolution branch are presented in Table 3.

| Input | Operator | Output channels | Repeats | Stride |
|---|---|---|---|---|
| 1048 × 2048 × 3 | Conv2d | 32 | 1 | 2 |
| 512 × 1024 × 32 | DWConv | 32 | 1 | 2 |
| 256 × 512 × 32 | Conv2d (1 × 1) | 64 | 1 | 1 |
| 256 × 512 × 64 | DWConv | 64 | 1 | 2 |
| 128 × 256 × 64 | Conv2d (1 × 1) | 128 | 1 | 1 |
| 128 × 256 × 28 | DWConv | 128 | 1 | 1 |
| 64 × 128 × 128 | Conv2d (1 × 1) | 128 | 1 | 1 |

In an embodiment, a pooling convolutional layer 653 applies 32 filters to the high resolution image 651 and generates 32 feature maps. In Step 313, three layers of depth-wise separable convolution with kernel size of 3×3 are used.

The depth-wise separable convolution block comprises depth-wise convolution layer followed by a 1×1 point wise convolutional layer. In FIG. 4, the two layers of each depth-wise separable convolution is represented as a single block.

The first depth-wise separable convolution block 655 has 32 input channels, 64 output channels and a stride of 2. The second depth-wise separable convolution block 657 has 64 input channels, 128 output channels and a stride of 2. The third depth-wise separable convolution 659 has 128 input channels, 128 output channels and a stride of 1.

The higher number of feature maps makes the use of depth-wise separable convolution more advantageous to the system in comparison with two-dimensional convolution.

In an embodiment, the full-resolution branch of the object classification system is primarily responsible for refining the global context, extracted by the lower-resolution branch. In order to achieve higher accuracy and better object classification results, the depth—wise separable convolution blocks in the full-resolution branch are employed directly. While the bottleneck implementation of depth-wise separable convolution favours network branches comprised of a big number of layers, where the speed of operation is more important than the achieved classification accuracy, the direct approach provides higher precision of the object classification at the cost of reduced operating speed. The smaller number of neural network layers in the full-resolution branch, however, compensates for the higher number of operations.

In an embodiment, a single feature fusion unit is used to merge the output volumes of the two sub-network branches, Step S661, as described with reference to S315 of FIG. 3. The process of merging feature maps involves holding the features in the system memory. A single feature fusion unit accounts for more efficient design which complies with the low resource devices requirement.

In an embodiment, while the output volumes of the two branches comprise the same number of feature maps, the features maps at the end of the two branches differ in spatial dimensions. The spatial dimensions of the feature maps of the lower-resolution branch (branch-4) are smaller than the spatial dimensions of the feature maps of the full-resolution branch (branch-1). Therefore, the output of the lower-resolution sub-network branch is processed by an Upsampling layer, where the feature maps are up-scaled by a factor of 4, Table 4.

| Branch -1 | Branch -4 |
|---|---|
| — | Upsample × 4 |
| — | DWConv (dilation 4) |
| Conv2d 1/1 - | 3/1, f |
| | Conv2d 1/1, - |
| Add, f | |

In a further embodiment, the upsampling layer is followed by a depth-wise convolution layer with a dilation factor different from 1. Dilation convolutional layer increases the space between the objects on the feature maps. Dilating depth-wise convolution affects only the size of the kernel, in particular the size of the kernel is increased exponentially. For example, a Depth-wise convolution with dilation factor of 1 will have an original kernel size of 3×3, whereas a convolution with dilation factor of 2 will have kernel size of 7×7 and convolution with dilation factor of 4 will have kernel size of 15×15. It should be noted that although the dilation is of kernel size 7×7, it only has 9 computations.

Summation of output volumes can only be implemented if the volumes comprise the same spatial dimensions and the same number of feature maps. Therefore a layer of two-dimensional convolution is used to generalise the outputs of the two branches before they are added together. These convolutional layers provide an additional precaution in case the output volumes of the two branches comprise a different number of feature maps.

In the final step, the feature maps are just directly added together. Thus, the number of parameters that need to be stored in the memory does not increase.

In an embodiment, the feature fusion unit is followed by a soft-max convolutional layer, Step 663, as described with reference to Step S317 of FIG. 3, which yields the probability scores for each class label.

Figure 6:
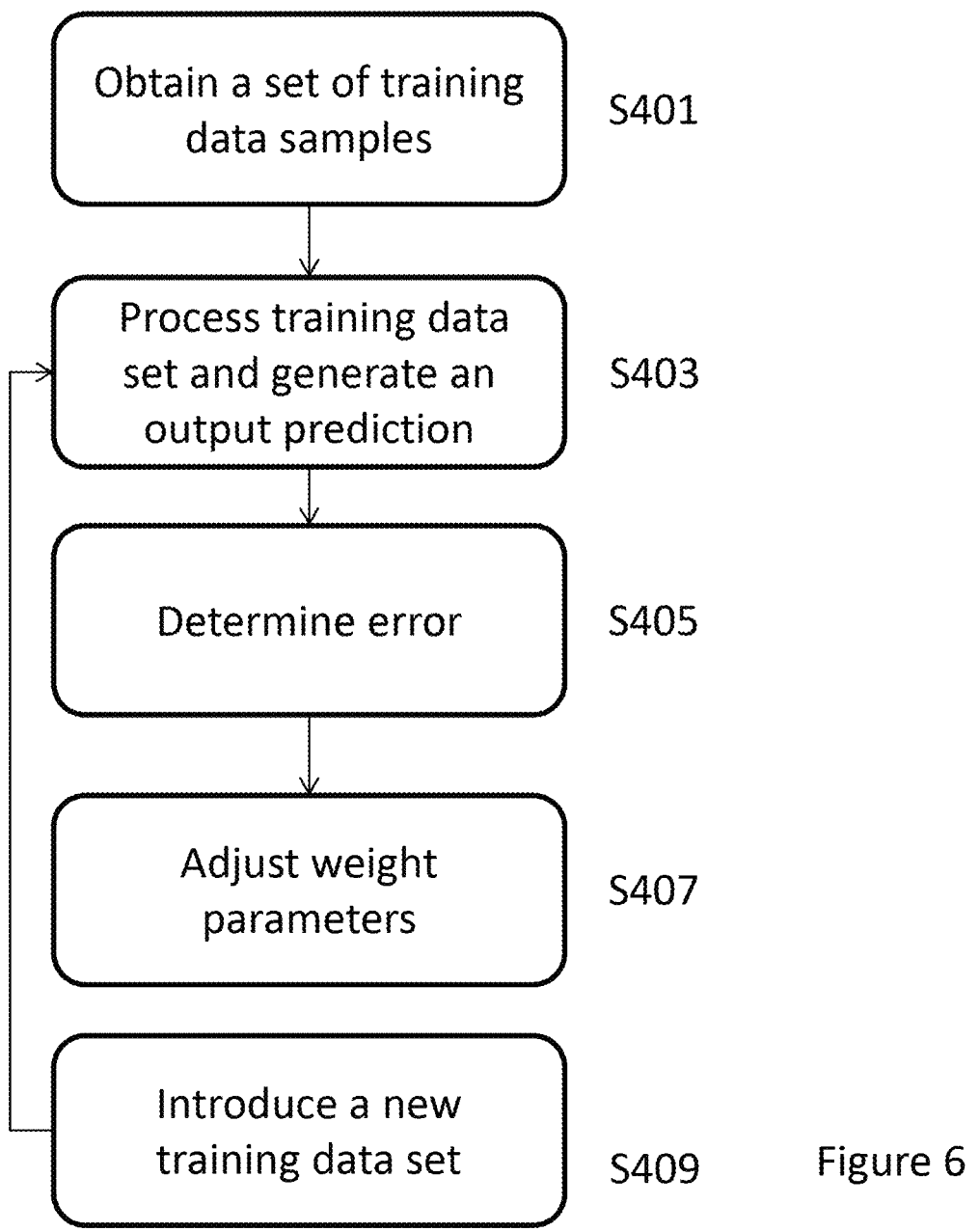
FIG. 6 is a flow diagram of an example process for training the neural network for object classification.

FIG. 6 illustrates a flowchart of an example process for training an object classification neural network, which can label objects shown in an input image. The neural network can be trained by processing many samples of training and, for every sample, adjusting the weight of each parameter in accordance with the error between the output generated by the neural network and a target output specified in the training sample. Once trained, the neural network can be deployed in a system, for example the neural network system of FIG. 1. The training procedure can be carried out by one or more computers.

In Step S401, the training system obtains a set of training data. Each data set comprises a training image and a target output. The input image is a representation of an image that shows one or more objects. For example, the image may include objects located in the vicinity of an autonomous or semi-autonomous vehicle. The training images represented by the training data set are different from one another and may or may not contain similar objects.

The training data sets comprise a finite number of scenes, which can be used for training the neural network. In an embodiment, standard data augmentation techniques may be used to expand the number sample images. Augmentation techniques include but are not limited to random scale factor in the range 0.5 to 2, horizontal flip, varied hue, saturation, brightness and contrast.

The training target output of the training data sets represents the desired output of the object classification network which should be generated by the neural network. The target output is compared with the actual output of the neural network and the weighting parameters are adjusted so that the error between the target output and the generated output is reduced. In Step S403, the neural network processes a sample input image using the current values of the internal parameters and generates an output image.

In Step S405, the predicted output of the neural network is compared with the target output part of the training data set and the error in the prediction is estimated. Consecutively, in Step S407 the weight of each internal parameter is adjusted so that the error between the predicted output and the target output is reduced to minimum.

In Step 409, the neural network is provided with a different set of training data and the training returns to step S403 in order to repeat the training procedure and adjust the internal parameters of the neural network so that a smaller error in the predicted output and the target output is achieved.

As explained with reference to FIGS. 2 to 5, there are two branches to the architecture.

In a further embodiment, during training a weighted auxiliary loss is used for the low-resolution branch. Weighting the loss in this manner ensures that meaningful features for semantic segmentation are extracted by the branch for global context, and are learned independently from the other branch. In an embodiment, the weight of the auxiliary loss was set to 0.4. In an embodiment this is achieved by rather than just having 1 output during training, an additional output is generated after 529 (i.e. a new softmax layer is introduced at this stage, forking off from the branch). The output of the softmax layer is evaluated (task is also segmentation). The output of both layers is used for updating weights.

In an embodiment of the training process of the neural network, network pruning is implemented. In the initial stages of the training, the number of feature maps is doubled and training is conducted using the described above procedure. The number of parameter is decreased progressively to 1.75, 1.5, 1.25, and 1 times the original size, where the training procedure is repeated after each reduction of parameters. Network pruning effectively reduces the number of parameters in the network while preserving the same performance. This is achieved by removing features which are not used in the neural network architecture. Furthermore, network pruning allows for more efficient learning as only the required features are learned by the network.

Thus, pruning is usually used to reduce the parameters. However, in the embodiment described herein, since the number of parameters is acceptable, the pruning is performed to increase performance. Thus, the expressiveness of the network is doubles (double the number of parameters). Now the network is much slower since more filters exist (double the number). However, pruning is used to reach the original number of filters again. Here, pruning enlarges the number of filters (allows more), then selects the once which are good.

Figure 7:
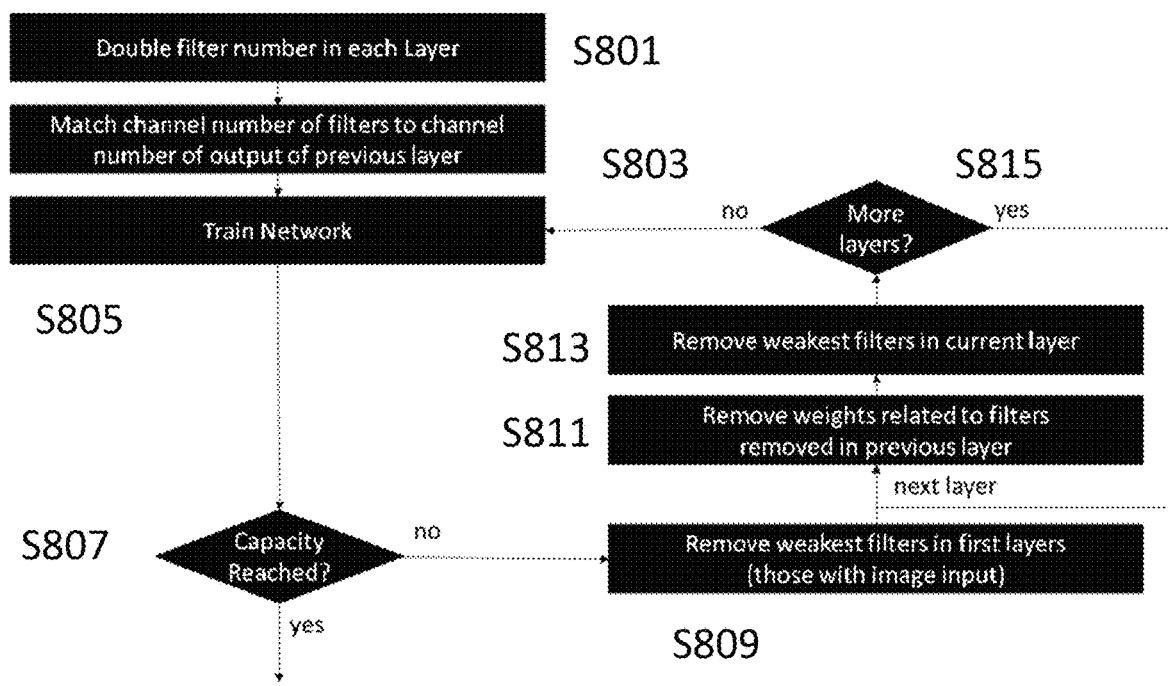
FIG. 7 is a flow diagram showing a parameter pruning process.

Thus, in this embodiment of the training process of the neural network, the number of filters is doubled at the start of the training procedure. How this is done will be described with reference to FIG. 7. In step S801 the filter number for each layer is doubled. In step S803, the channel number of filters are matched to the channel number of the output of the previous layers. Say for example, each layer has an input size h×w and an output size h'×w'. All these layers have depth/channels related to the number of filters used. I.e. given h'×c, c' filters of size 3×3 (for example) can be used to produce h'×w'×c'. If, as in step S801, the number of filters of the prior layer are double, then there are h×w×2c inputs, and 2c' filters of size 3×3×2c are used.

In step S805, the network is trained as described in relation to FIG. 6. In step S807, it is determined if the capacity is reached, i.e. if the target number of filters has been reached.

In step S809, the weakest filters in the first layers (those with image input), are identified and removed. These filters may be identified many different metrics, in one embodiment the $l_1$ sum is used. For example, using the above dimensions, h×w×1.5c is now the input. The filters of the next layer are of size 3×3×2c, thus, in step S811, the weights that are related to the removed filters of previous layer are removed to get filters of size 3×3×1.5c. Then, in step S813, the weakest filters in the current layer are determined and the process is continued.

In step S815, it is checked to see if there are more layers which are affected by the removal of the filters in steps S811 and S813. If there are, the process loops back to step S811. Once all of the weakest filters and weights have been removed, the process returns to the training step S807. Once the network has been trained, it is then checked of the number of filters is to be reduced further (for example here, the number of filters are reduced from 2×, to 1.75× to 1.5× to 1.25× to 1×). If a further reduction is required, the process moves to step S809 to remove further filters. Otherwise the process finishes and the network is trained and pruned.

In an embodiment, batch normalisation is used after every layer during training. Batch normalisation allows each layer of the neural network to learn more independently of the other layers. Batch normalisation scales the activations in the feature maps of the previous layer. As all activations throughout the neural network are in a given range there are no activations associated with too high or too low values. This allows for higher learning rates and improved feature learning.

In an embodiment, dropout of a set of neural network nodes is implemented before the soft-max layer. Dropout is a training approach which reduces the interdependent learning amongst the neurons in the network. During training a random set of nodes is dropped out of the network, so that a reduced version of the network is created. The reduced version of the network learns independently of other sections of the neural network and hence prevents neurons from developing co-dependency amongst one another.

To demonstrate the above an ablation study of the above was then made using the Cityscapes dataset [M. Cordts, M. Omran, S. Ramos, T. Rehfeld, M. Enzweiler, R. Benenson, U. Franke, S. Roth, and B. Schiele. The cityscapes dataset for semantic urban scene understanding. In CVPR, 2016], and report its performance on the Cityscapes benchmark.

The experiments were performed on a workstation with Nvidia Titan X (Maxwell, 3072 CUDA cores), CUDA 8.0 and cuDNN V6. ReLU6 was used as nonlinearity function due to its robustness when used with low-precision computations. During training, batch normalization is used at all layers and dropout is used before the soft-max layer only. During inference, parameters of batch normalization are merged with the weights and bias of parent layers. In the depth-wise convolution layers, we found that $l_2$ regularization is not necessary.

Since labelled training data was limited, standard data augmentation techniques were applied in all experiments: random scale 0.5 to 2, horizontal flip, varied hue, saturation, brightness and contrast.

The models of ContextNet are trained with TensorFlow using RMSprop with a discounting factor of 0.9, momentum of 0.9 and epsilon parameter equal to 1. Additionally, a poly learning rate was applied with base rate 0.045 and power 0.98. The maximum number of epochs is set to 1000, as no pre-training is used.

Results are reported as mean intersection-over-union (mIoU) and runtime considers single threaded CPU with sequential CPU to GPU memory transfer, kernel execution, and GPU to CPU memory exchange.

Cityscapes is a large-scale dataset for semantic segmentation that contains a diverse set of images in street scenes from 50 different cities in Germany. In total, it consists of 25,000 annotated 1024 2048 px images of which 5,000 have labels at high pixel accuracy and 20,000 are weakly annotated. In the experiments presented herein only 5,000 images were used with high label quality: a training set of 2,975 images, validation set of 500 images and 1,525 test images which can be evaluated on the Cityscapes evaluation server. No pre-training was employed.

An ablation study was performed where the ablation study weights were learned solely from the Cityscapes training set, and the performance on the validation set is reported. In particular, effects on different resolution factors of the low resolution branch is reported, introducing multiple branches, and modifications on the number of parameters. Finally, the two branches are analysed in detail.

The input image resolution is the most critical factor for the computation time. In this example, the low resolution branch takes images of a quarter size at 256 512 px for Cityscapes images (denoted cn14). Alternatively, half (cn12) or one eighth (cn18) resolution could be used.

Table 4 shows how the different options affect the results. Overall, larger resolution in the deeper context branch produce better segmentation results. However, these improvements come at the cost of running time. In Table 4, ContextNet (cn14) compared to its version with half resolution (cn12) and eighth resolution (cn18) at the low resolution branch, and with multiple levels at quarter, half and full resolution (cn124) on Cityscapes validation set. Implementations with smaller memory footprint are also shown (cn14-500 and cn14-160).

TABLE 4

|  | cn18 | cn14 | cn12 | cn124 | cn14-500 | cn14-160 |
|---|---|---|---|---|---|---|
| Accuracy (mIoU in %) | 60.1 | 65.9 | 68.7 | 67.3 | 62.1 | 57.7 |
| Frames per Second | 21.0 | 18.3 | 11.4 | 7.6 | 20.6 | 22.0 |
| Number of Parameters (in millions) | 0.85 | 0.85 | 0.85 | 0.93 | 0.49 | 0.16 |

Table 5 lists the IoU in more detail. Here, a detailed IoU of ContextNet (cn14) compared to version with half (cn12) and eighth (cn18) resolution, and its multi-level version (cn124). Small-size classes (fence, pole, traffic light, traffic sign), classes with fine detail (person, rider, motorcycle, bicycle), and classes with very few samples (truck, bus, train) benefit from high resolution.

TABLE 5

|  | Road | Sidewalk | Building | Wall | Fence | Pole | Traffic light | Traffic sign | Vegetation | Terrain |
|---|---|---|---|---|---|---|---|---|---|---|
| cn18 | 96.2 | 73.4 | 87.4 | 45.9 | 44.1 | 32.1 | 38.4 | 54.3 | 87.9 | 54.1 |
| cn14 | 96.8 | 76.6 | 88.6 | 46.4 | 49.7 | 38.0 | 45.3 | 60.5 | 89.0 | 59.3 |
| cn12 | 97.2 | 78.9 | 89.2 | 47.2 | 54.4 | 39.5 | 55.3 | 63.8 | 89.4 | 59.8 |
| cn134 | 97.4 | 79.6 | 89.5 | 44.1 | 49.8 | 45.5 | 50.6 | 64.6 | 90.2 | 59.4 |

|  | Sky | Person | Rider | Car | Truck | Bus | Train | Motorcycle | Bicycle |
|---|---|---|---|---|---|---|---|---|---|
| cn18 | 91.0 | 62.3 | 36.1 | 88.3 | 57.6 | 59.1 | 34.2 | 41.1 | 58.4 |
| cn14 | 91.4 | 67.5 | 41.7 | 90.0 | 63.5 | 71.7 | 57.1 | 41.5 | 64.6 |
| cn12 | 91.5 | 70.2 | 47.5 | 91.1 | 70.2 | 76.7 | 63.7 | 51.36 | 67.8 |
| cn134 | 93.4 | 70.9 | 43.1 | 91.8 | 65.2 | 71.9 | 64.5 | 41.95 | 66.1 |

The accuracy of small-size classes (i.e. fence, pole, traffic light and traffic sign), classes with fine detail (i.e. person, rider, motorcycle and bicycle) and rare classes (i.e. bus, train and truck) benefit from increased resolution at the global context branch. Other classes are often of larger size, and can therefore be captured at lower resolution. We conclude that cn14 is fairly balanced at 18.3 frames per seconds (fps) and 65.9% mIoU.

In an embodiment, only two branches are explained above. However, branches at multiple resolutions could be employed. In addition to previous results, Table 4 and Table 5 also include a version of ContextNet with two shallow branches at half and full resolution (cn124). In comparison to cn14, cn124 improves accuracy by 1.4%.

Runtime however is reduced more than twice from 18.3 fps to 7.6 fps. Furthermore cn12 which has a deep sub-network at half resolution outperforms cn124 in terms of accuracy and speed. These results show that using deep sub-network on higher resolution is more beneficial than on lower resolution. Further, the number of layers have positive effect on accuracy and negative effect on run-time.

Thus, in the above example, a two branch shows promising results in real time. Apart from runtime, memory footprint is an important consideration for implementations on embedded devices. Table 4 includes two versions of ContextNet with drastically reduced number of parameters, denoted as cn14-500 and cn14-160. Surprisingly, ContextNet with only 159,387 and 490,459 parameters achieved 57.7% and 62.1% mIoU, respectively, on the Cityscapes validation set. These results show that the ContextNet design is flexible enough to adapt the computation time and memory requirements of the given system.

Global context with one fourth resolution and detail branches trained independently obtained 63.3% and 25.1% mIoU respectively. The context branch was found not to perform well on small-size classes and receptive field of the detail branch was not large enough for reasonable performance. Outputs (softmax) of context and detail networks were averaged to create an ensemble of networks, which are trained independently. Ensemble of both branches obtained 60.3% mIoU, which is 6.6% less than cn14 and 3% less than using the context branch alone. This provides further evidence that ContextNet architecture is a better choice for multi-scale features fusion.

In a further embodiment, the output of either the detail branch or the context branch was zeroed to observe their individual contributions. The results are shown in FIG. 6. FIG. 6 shows a visual comparison on Cityscape validation set. First row: input RGB images; second row: ground truths; third row: context branch outputs; fourth row: detail branch outputs; and last row: ContextNet outputs using both context and detail branches. ContextNet obtained 65.9% mIoU, while global context with one fourth resolution and detail branches trained independently obtained 63.3% and 25.1% mIoU respectively In the first column, it can be seen that the global context branch detects larger objects correctly (for example sky or trees) but fails around boundaries and thin regions. In contrast, the detail branch detects object boundaries correctly but fails at the centre region of objects.

One exception is the centre region of trees, which is classified correctly, probably due to the discriminative nature of tree texture. Finally, it can be seen that ContextNet correctly combines both information to produce improved results in last row. Similarly, in the middle column it can be seen that segmentation of the pedestrians are refined by ContextNet over the global context branch output. In the last column, even though detail branch detects poles and traffic signs, ContextNet fails to effectively combine some of these with the global context branch. Overall it can be seen that the context branch and the detail branch learn complementary information.

The results from the above embodiment are:

TABLE 6

|  | Class mIoU (in %) | Category mIoU (in %) | Parameters (in millions) |
|---|---|---|---|
| ContextNet | 66.1 | 82.7 | 00.85 |

The runtime for images with different resolutions are shown below:

TABLE 7

|  | 1024 × 2048 | 512 × 1024 | 256 × 512 |
|---|---|---|---|
| ContextNet | 18.3 | 65.5 | 139.2 |
| ContextNet† | 23.2 | 84.9 | 150.1 |

The measurement with '†' denotes kernel execution time alone.

Figure 8:
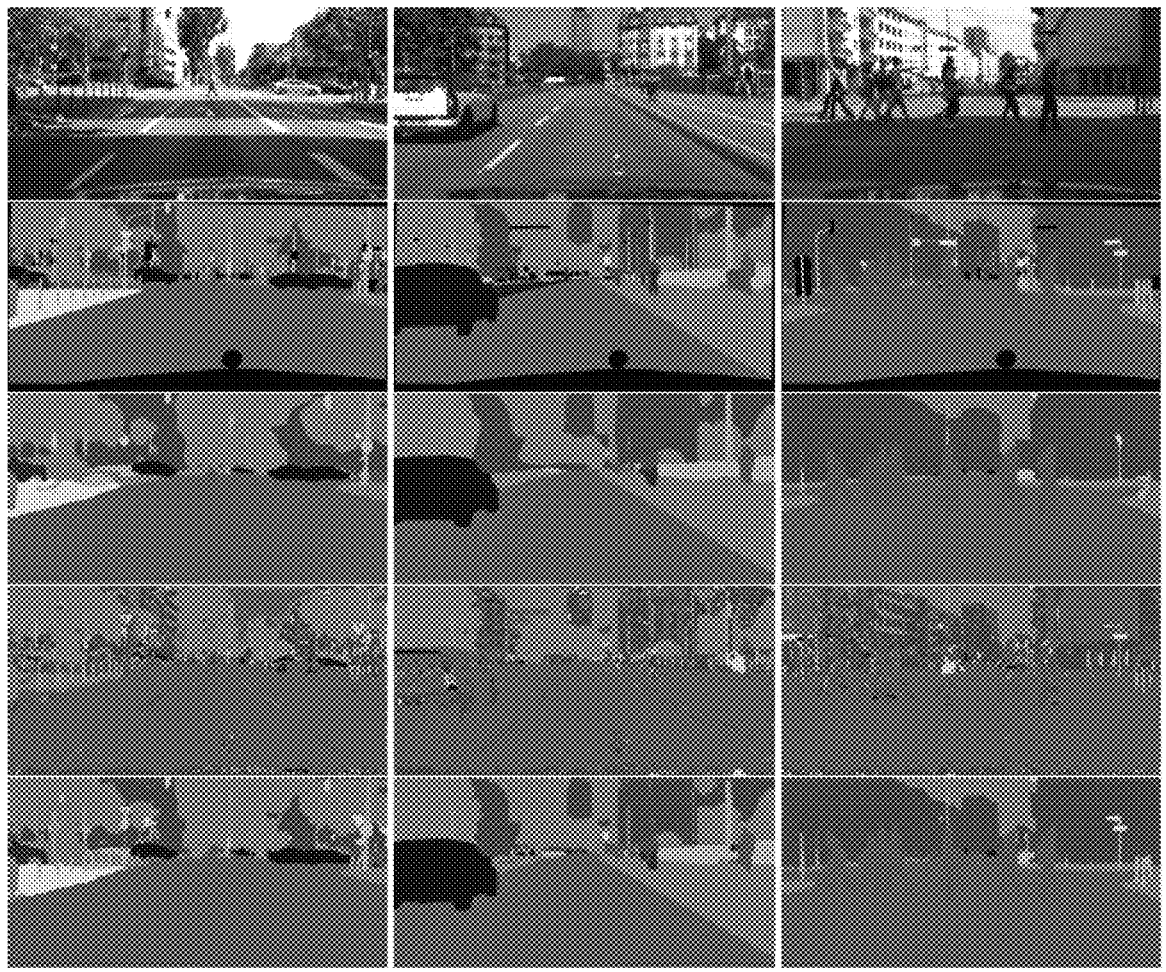
FIG. 8 shows a visual comparison on Cityscape validation set. First row: input RGB images; second row: ground truths; third row: context branch outputs; fourth row: detail branch outputs; and last row: outputs using both context and detail branches.

The above figures include the complete CPU and GPU pipeline including memory transfers. If parallel memory transfer and kernel execution are employed, the run time improves to 23.2 fps. Finally, in Table 7 we observe that ContextNet scales well for smaller input resolution sizes, and therefore can be tuned for the task at hand and the available resources. The results of ContextNet are displayed in FIG. 8 for qualitative analysis. ContextNet is able to segment even small objects at far distances adequately.

Network Pruning is used to prune a wider networks (larger number of feature maps) to obtain "skinnier" networks in order to increase the accuracy of a model. First, the network is trained with twice the (target) number of feature maps to obtain improved results. The number of parameters are then progressively decreased by pruning to 1.5, 1.25 and 1 times the original size. In an embodiment, the filters were pruned with lowest $l_1$ sum. Via pruning the mIoU was improved from 64.2% to 66.1% on the Cityscape test set.

The above embodiments relate to a real-time semantic segmentation model which combines a deep network branch at low resolution but with large receptive field with a shallow and therefore efficient full resolution branch to enhance segmentation details. The above architecture further extensively leverages depth-wise convolutions and bottleneck residual blocks for maximum memory and runtime efficiency.

The above study shows that the architecture effectively combines global and local context to achieve competitive results. Also, model pruning (in order to reach given targets of network size and real-time performance) leads to improved segmentation accuracy. Demonstrating that the architecture is beneficial for other tasks relevant for autonomous systems such as single-image depth prediction is part of future work.

Figure 9:
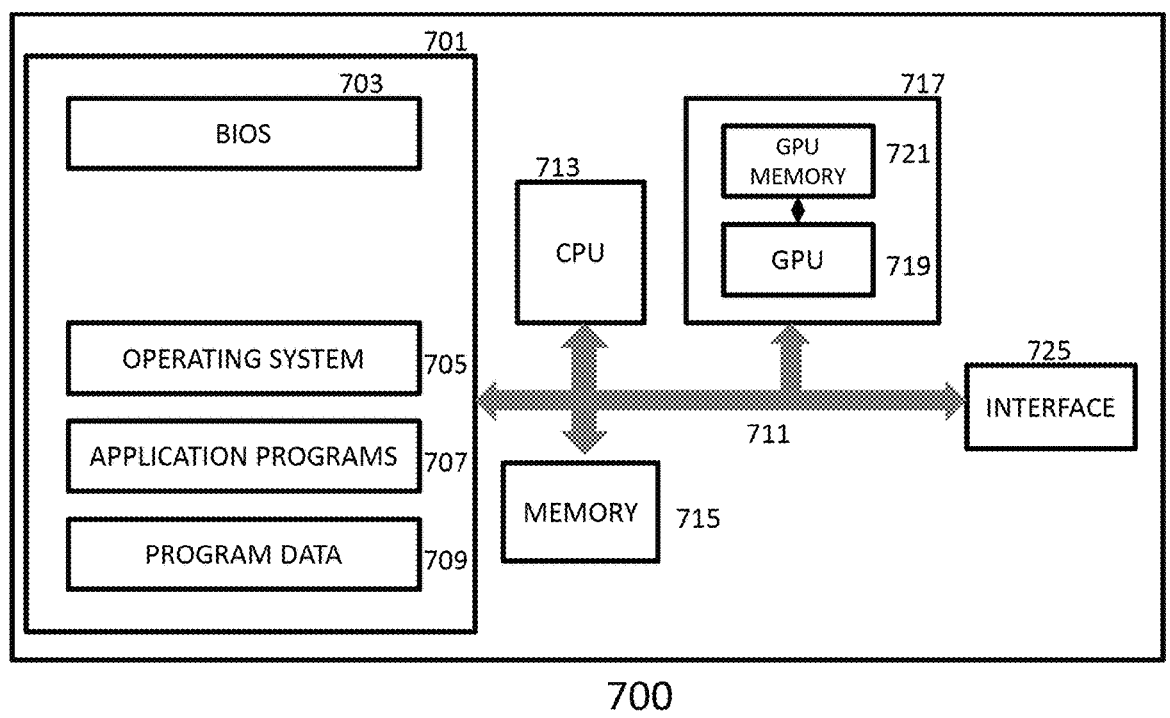
FIG. 9 is a schematic of a device that can be used in accordance with an embodiment.

FIG. 9 is a schematic of the hardware that can be used to implement methods in accordance with embodiments. It should be noted that this is just one example and other arrangements can be used.

The hardware comprises a computing section 700. In this particular example, the components of this section will be described together. However, it will be appreciated they are not necessarily co-located.

Components of the computing system 700 may include, but not limited to, a processing unit 713 (such as central processing unit, CPU), a system memory 701, a system bus 711 that couples various system components including the system memory 701 to the processing unit 713. The system bus 711 may be any of several types of bus structure including a memory bus or memory controller, a peripheral bus and a local bus using any of a variety of bus architecture etc. The computing section 700 also includes external memory 715 connected to the bus 711.

The system memory 701 includes computer storage media in the form of volatile/or nonvolatile memory such as read-only memory. A basic input output system (BIOS) 703 containing the routines that help transfer information between the elements within the computer, such as during start-up is typically stored in system memory 701. In addition, the system memory contains the operating system 705, application programs 707 and program data 709 that are in use by the CPU 713.

Also, interface 725 is connected to the bus 711. The interface may be a network interface for the computer system to receive information from further devices. The interface may also be a user interface that allows a user to respond to certain commands et cetera.

In this example, a video interface 717 is provided. The video interface 717 comprises a graphics processing unit 719 which is connected to a graphics processing memory 721.

Graphics processing unit (GPU) 719 is particularly well suited to the above described method due to the operation of this multiple parallel calls. Therefore, in an embodiment, the processing may be divided between CPU 713 and GPU 719.

In one embodiment, the GPU is a NVIDIA Jetson TX2, which is a low power GPU chip.

In one embodiment, a dedicated computing device 700 is provided linked to each camera (see FIG. 1). The architecture described above in relation to FIGS. 2 to 4 avoids the need for floating point computation and therefore the computing device is well suited to low power locations such as combined with cameras on a vehicle.

The above described architecture also lends itself to mobile telephones using GPUs.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. An image processing method for segmenting an image, the method comprising:
   receiving first image;
   producing a second image from said first image, wherein said second image is a lower resolution representation of said first image;
   processing said first image with a first processing stage to produce a first feature map;
   processing said second image with a second processing stage to produce a second feature map; and
   combining the first feature map with the second feature map to produce a semantic segmented image;
   wherein the first processing stage comprises a first neural network comprising at least one separable convolution module configured to perform separable convolution and said second processing stage comprises a second neural network comprising at least one separable convolution module configured to perform separable convolution; a number of layers in the first neural network being smaller than a number of layers in the second neural network.

2. An image processing method according to claim 1, wherein the first feature map and the second feature map are combined at just one stage.

3. An image processing method according to claim 2, wherein the first feature map and the second feature map are combined by adding.

4. An image processing method according to claim 2, wherein the first feature map and the second feature map are combined at a fusion stage, wherein said fusion stage comprises upsampling the second feature map and adding the first feature map to the second feature map wherein adding comprises adding corresponding values of the upsampled second feature map and the first feature map.

5. An image processing method according to claim 4, wherein upsampled second feature map is subjected to depthwise convolution prior to adding to the first feature map, wherein the depthwise convolution is performed with a dilation factor that is greater than 1.

6. An image processing method according to claim 5, wherein upsampled second feature map has been subjected to depthwise convolution with a dilation factor that is greater than 1 and the first feature map are subjected to two dimensional convolution prior to adding.

7. An image processing method according to claim 1, wherein separable convolution modules in the second processing stage are depthwise convolution modules.

8. An image processing method according to claim 1, wherein separable convolution modules in the second processing stage are bottleneck architecture modules.

9. An image processing method according to claim 1, wherein separable convolution modules in the second processing stage are bottleneck residual architecture modules.

10. An image processing method according to claim 1, wherein the second image is subjected to standard convolution prior to be processed by said separable convolution modules.

11. An image processing method, according to claim 9, wherein there are a plurality of residual bottleneck architecture modules.

12. An image processing method according to claim 11, wherein a final standard convolution module is provided after the residual bottleneck architecture modules.

13. An image processing method according to claim 12, wherein a pyramid pooling module is provided between the final standard convolution module and the residual bottleneck architecture modules.

14. An image processing method according to claim 1, wherein the first processing stage comprises a plurality of depthwise separable convolution modules.

15. A method of training a model, said model for segmenting an image, the model comprising:
a first neural network having a plurality of layers comprising at least one separable convolution module configured to perform separable convolutions;
a second neural network with a plurality of layers, comprising at least one separable convolution module configured to perform separable convolutions; a number of layers in the first neural network being smaller than a number of layers in the second neural network,
the first neural network being configured to process an image at a first resolution and the second neural network being configured to process the same image at a lower resolution,
a feature map of the first and second neural networks being combined by addition at a single stage;
the training method comprising:
providing training data, the training data comprising images and semantic segmented information concerning said images;
training said model using said images as input and the semantic segmented information as output, wherein two stages are trained together.

16. A method according to claim 15, further comprising increasing a number of filters during training, and reducing their number to discard filters of lower importance.

17. A method according to claim 15, further comprising adapting the model during training to add a second output on said second processing stage, the method further comprising training using the images as input and determining loss by comparing with both the semantic segmented information at both the output and at the second output and updating weights during training by using the determined losses from both outputs.

18. An image processing system for segmenting an image, the system comprising:
an interface and a processor,
said interface having an image input and being adapted to receive a first image, said processor being adapted to;
produce a second image from said first image, wherein said second image is a lower resolution representation of said first image;
process said first image with a first processing stage to produce a first feature map;
process said second image with a second processing stage to produce a second feature map; and
combine the first feature map with the second feature map to produce a semantic segmented image;
wherein the first processing stage comprises a first neural network comprising at least one separable convolution module configured to perform separable convolution and said second processing stage comprises a second neural network comprising at least one separable convolution module configured to perform separable convolution; a number of layers in the first neural network being smaller than a number of layers in the second neural network.

19. A detection system for a vehicle, said detection system, comprising the image processing system of claim 18, being adapted to receive an image and determine objects from said image by segmenting said image.

20. A non-transitory carrier medium carrying computer readable instructions adapted to cause a computer to perform the method of claim 1.

* * * * *